US012112625B2

(12) United States Patent
Nagai et al.

(10) Patent No.: US 12,112,625 B2
(45) Date of Patent: Oct. 8, 2024

(54) INTERSECTION CONTROL SYSTEM, INTERSECTION CONTROL METHOD, AND NON-TRANSITORY STORAGE MEDIUM

(71) Applicant: TOYOTA JIDOSHA KABUSHIKI KAISHA, Toyota (JP)

(72) Inventors: Manabu Nagai, Nagoya (JP); Daisaku Honda, Kasugai (JP); Suguru Watanabe, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 332 days.

(21) Appl. No.: 17/574,776

(22) Filed: Jan. 13, 2022

(65) Prior Publication Data

US 2022/0292958 A1 Sep. 15, 2022

(30) Foreign Application Priority Data

Mar. 11, 2021 (JP) ................................ 2021-038864

(51) Int. Cl.
*G08G 1/08* (2006.01)

(52) U.S. Cl.
CPC ...................................... *G08G 1/08* (2013.01)

(58) Field of Classification Search
CPC ........................................................ G08G 1/08
See application file for complete search history.

(56) References Cited

U.S. PATENT DOCUMENTS 6,169,495 B1 1/2001 Koike
8,700,299 B2 * 4/2014 Morita ............. G08G 1/096716 701/123
10,181,264 B2 * 1/2019 MacNeille .............. H04W 4/46
(Continued)

FOREIGN PATENT DOCUMENTS

CN 109003448 A 12/2018
JP H11-126294 A 5/1999
(Continued)

OTHER PUBLICATIONS

Hui, Shengwo; "Road Traffic Management"; Wuhan University Press; Feb. 28, 2018; p. 20.
(Continued)

*Primary Examiner* — Hussein Elchanti
(74) *Attorney, Agent, or Firm* — Oliff PLC

(57) ABSTRACT

An intersection control system includes: a storage storing multiple pieces of intersection control information that are different from each other, each piece of the intersection control information including multiple pieces of permitted trajectory information each of which indicates a permitted travel trajectory that a vehicle is permitted to follow, and a plurality of the travel trajectories not interfering with each other; and one or more processors configured to acquire multiple pieces of travel trajectory information each of which indicates a travel trajectory that each of a plurality of the vehicles located near the intersection follows when passing through the intersection, select a piece of the intersection control information that matches the pieces of the travel trajectory information from among the pieces of the intersection control information, and send the selected piece of the intersection control information to the vehicles located near the intersection.

11 Claims, 11 Drawing Sheets

(56) References Cited

U.S. PATENT DOCUMENTS

| | | | | |
|---|---|---|---|---|
| 10,365,115 | B2 * | 7/2019 | Nair | G08G 1/0145 |
| 10,733,883 | B1 * | 8/2020 | Bauer | G08G 1/096783 |
| 10,926,777 | B2 * | 2/2021 | McGill | B60W 30/09 |
| 11,192,549 | B2 * | 12/2021 | Lanfranco | G06V 20/584 |
| 11,450,201 | B2 * | 9/2022 | Malkes | G08G 1/005 |
| 2005/0104745 | A1 * | 5/2005 | Bachelder | G08G 1/01 340/988 |
| 2005/0187701 | A1 * | 8/2005 | Baney | G08G 1/096716 340/907 |
| 2009/0167561 | A1 * | 7/2009 | Liang | G08G 1/095 340/907 |
| 2009/0287401 | A1 * | 11/2009 | Levine | G08G 1/096805 701/117 |
| 2010/0030458 | A1 * | 2/2010 | Coughlin | B60W 40/09 701/123 |
| 2010/0082190 | A1 * | 4/2010 | Jinno | B60K 6/52 903/918 |
| 2010/0171640 | A1 * | 7/2010 | Delia | G08G 1/07 340/907 |
| 2010/0305804 | A1 * | 12/2010 | Taguchi | G08G 1/166 701/31.4 |
| 2010/0308986 | A1 * | 12/2010 | Dobryden | G08C 17/02 340/439 |
| 2011/0043348 | A1 * | 2/2011 | Blackard | F16H 63/42 340/439 |
| 2011/0126797 | A1 * | 6/2011 | Russell | F02D 19/0692 123/294 |
| 2014/0336913 | A1 * | 11/2014 | Fino | G01C 21/3691 701/465 |
| 2015/0145995 | A1 * | 5/2015 | Shahraray | H04W 4/021 348/148 |
| 2015/0154860 | A1 * | 6/2015 | Holzwanger | G08G 1/005 340/944 |
| 2016/0148507 | A1 * | 5/2016 | Pittman | G06Q 30/0255 340/917 |
| 2016/0161271 | A1 * | 6/2016 | Okumura | B60W 30/09 701/25 |
| 2016/0358463 | A1 * | 12/2016 | Cho | G08G 1/0145 |
| 2017/0124868 | A1 * | 5/2017 | Bhat | G08G 1/09623 |
| 2017/0154525 | A1 * | 6/2017 | Zou | G08G 1/095 |
| 2018/0074502 | A1 * | 3/2018 | Holben | B60W 60/00253 |
| 2018/0075739 | A1 * | 3/2018 | Ginsberg | B60K 35/00 |
| 2018/0095466 | A1 * | 4/2018 | Allan | B60W 60/00253 |
| 2018/0151064 | A1 * | 5/2018 | Xu | G08G 1/0116 |
| 2018/0157258 | A1 * | 6/2018 | O'Brien | G05D 1/0088 |
| 2018/0253968 | A1 * | 9/2018 | Yalla | G08G 1/097 |
| 2018/0261083 | A1 * | 9/2018 | Sun | G08G 1/0112 |
| 2019/0082377 | A1 * | 3/2019 | Silver | G08G 1/161 |
| 2019/0122178 | A1 * | 4/2019 | Kempf | G06Q 10/063114 |
| 2019/0122548 | A1 * | 4/2019 | Sakuma | G08G 1/08 |
| 2019/0180617 | A1 * | 6/2019 | Hori | B60W 50/0097 |
| 2019/0272747 | A1 * | 9/2019 | Raamot | G08G 1/0129 |
| 2019/0318620 | A1 * | 10/2019 | Yang | G05D 1/0027 |
| 2020/0026283 | A1 * | 1/2020 | Barnes | G06V 20/58 |
| 2020/0184238 | A1 * | 6/2020 | Kobayashi | G06V 40/161 |
| 2020/0193813 | A1 | 6/2020 | Sui | |
| 2020/0234582 | A1 * | 7/2020 | Mintz | G08G 1/096811 |
| 2020/0250473 | A1 * | 8/2020 | Elluswamy | G06F 18/28 |
| 2020/0272159 | A1 * | 8/2020 | Zhang | G08G 1/22 |
| 2020/0294394 | A1 | 9/2020 | Guo et al. | |
| 2020/0310448 | A1 * | 10/2020 | Yamada | G05D 1/0088 |
| 2020/0365015 | A1 | 11/2020 | Nguyen | |
| 2021/0009154 | A1 * | 1/2021 | Wray | G08G 1/164 |
| 2021/0053566 | A1 * | 2/2021 | Kobayashi | B60W 40/04 |
| 2022/0009491 | A1 * | 1/2022 | Taruoka | B60W 30/18154 |
| 2022/0068124 | A1 * | 3/2022 | Kobashi | G08G 1/056 |
| 2022/0269836 | A1 * | 8/2022 | Mukundan | B60W 60/00276 |
| 2022/0340172 | A1 * | 10/2022 | Pendleton | B60W 30/0956 |
| 2023/0286508 | A1 * | 9/2023 | Pcolka | G08G 1/22 |

FOREIGN PATENT DOCUMENTS

| | | |
|---|---|---|
| JP | 2003-217086 A | 7/2003 |
| JP | 2008-003952 A | 1/2008 |
| JP | 2008-305090 A | 12/2008 |
| JP | 2011-065556 A | 3/2011 |
| JP | 2011-159152 A | 8/2011 |
| JP | 2014-041588 A | 3/2014 |
| JP | 2014-056483 A | 3/2014 |

OTHER PUBLICATIONS

English Translation of May 12, 2023 Office Action issued in Chinese Patent Application No. 202210049315.X.

* cited by examiner

FIG. 4

| CONTROL NO. | INTERSECTION CONTROL INFORMATION |
|---|---|
| 1 | 000 000 100 111 |
| 2 | 111 000 000 100 |
| 3 | 100 111 000 000 |
| 4 | 000 100 111 000 |
| 5 | 100 000 100 101 |
| 6 | 101 100 000 100 |
| 7 | 100 101 100 000 |
| 8 | 000 100 101 100 |
| 9 | 100 110 000 100 |
| 10 | 100 100 110 000 |
| 11 | 000 100 100 110 |
| 12 | 110 000 100 100 |
| 13 | 000 110 000 110 |
| 14 | 110 000 110 000 |
| 15 | 001 100 001 100 |
| 16 | 100 001 100 001 |
| 17 | 100 100 100 100 |

FIG. 5

| bit | 1 | 2 | 3 | 4 | 5 | 6 | 7 | 8 | 9 | 10 | 11 | 12 |
|---|---|---|---|---|---|---|---|---|---|---|---|---|
| | TURN LEFT FROM NORTH | GO STRAIGHT FROM NORTH | TURN RIGHT FROM NORTH | TURN LEFT FROM EAST | GO STRAIGHT FROM EAST | TURN RIGHT FROM EAST | TURN LEFT FROM SOUTH | GO STRAIGHT FROM SOUTH | TURN RIGHT FROM SOUTH | TURN LEFT FROM WEST | GO STRAIGHT FROM WEST | TURN RIGHT FROM WEST |

| | AFTER ONE SECOND | AFTER TWO SECONDS | AFTER THREE SECONDS |
|---|---|---|---|
| VEHICLE ENTERING FROM NORTH | ENTRY OF RIGHT TURN VEHICLE | | |
| VEHICLE ENTERING FROM EAST | | | |
| VEHICLE ENTERING FROM SOUTH | | | |
| VEHICLE ENTERING FROM WEST | | | ENTRY OF LEFT TURN VEHICLE |

FIG. 17

| bit | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| | 1→2 | 1→3 | 1→4 | 1→5 | 2→1 | 2→3 | 2→4 | 2→5 | 3→1 | 3→2 | 3→4 | 3→5 | 4→1 | 4→2 | 4→3 | 4→5 | 5→1 | 5→2 | 5→3 | 5→4 |

INTERSECTION CONTROL SYSTEM, INTERSECTION CONTROL METHOD, AND NON-TRANSITORY STORAGE MEDIUM

CROSS-REFERENCE TO RELATED APPLICATION

This application claims priority to Japanese Patent Application No. 2021-038864 filed on Mar. 11, 2021, incorporated herein by reference in its entirety.

BACKGROUND

1. Technical Field

The present disclosure relates to an intersection control system, an intersection control method, and a non-transitory storage medium.

2. Description of Related Art

Japanese Unexamined Patent Application Publication No. 2011-159152 (JP 2011-159152 A) discloses a traffic signal control system that controls multiple traffic signal lights installed at an intersection. Specifically, multiple vehicle sensors is installed on multiple roads connected to an intersection, and a control pattern suitable for controlling multiple traffic signal lights is selected based on sensor signals output from the vehicle sensors.

SUMMARY

In the traffic signal control system of JP 2011-159152 A, multiple travel trajectories that cross each other at an intersection are permitted in order to increase the number of vehicles that can enter the intersection. Therefore, advanced control is required that avoids a collision with other vehicle(s) when a vehicle passes through an intersection.

The present disclosure provides a technique that increases the number of vehicles that can enter an intersection at the same time while avoiding at low cost a collision between or among multiple vehicles entering the intersection at the same time.

An intersection control system according to a first aspect of the present disclosure includes: a storage storing multiple pieces of intersection control information that are different from each other, each of the pieces of the intersection control information including multiple pieces of permitted trajectory information that are different from each other, each of the pieces of the permitted trajectory information being information indicating a travel trajectory that a vehicle is permitted to follow when passing through an intersection, and a plurality of the travel trajectories indicated by the pieces of the permitted trajectory information included in each of the pieces of the intersection control information not interfering with each other; and one or more processors configured to control entry of the vehicle into the intersection using the pieces of the intersection control information by acquiring multiple pieces of travel trajectory information each of which indicates a travel trajectory that each of a plurality of the vehicles located near the intersection follows when passing through the intersection, selecting a piece of the intersection control information that matches the pieces of the travel trajectory information from among the pieces of the intersection control information, and sending the selected piece of the intersection control information to the vehicles located near the intersection. According to the above configuration, the number of vehicles that can enter an intersection at the same time can be increased while avoiding at low cost a collision between or among multiple vehicles entering the intersection at the same time.

In the above aspect, the travel trajectories indicated by the pieces of the permitted trajectory information included in each of the pieces of the intersection control information may neither merge with each other nor intersect each other According to the above configuration, a collision between or among multiple vehicles entering the intersection at the same time can be avoided.

In the above aspect, each of the pieces of the travel trajectory information may include pre-passage road identification information and post-passage road identification information. The pre-passage road identification information may indicate a road on which the vehicle travels before passing through the intersection, and the post-passage road identification information may indicate a road on which the vehicle travels after passing through the intersection.

In the above aspect, each of the pieces of the travel trajectory information may include pre-passage direction identification information and post-passage direction identification information. The pre-passage direction identification information may indicate a direction in which the vehicle travels before passing through the intersection, and the post-passage direction identification information may indicate a direction in which the vehicle travels after passing through the intersection.

In the above aspect, the one or more processors may be configured to, when there is no vehicle passing through the intersection, select, from among the pieces of the intersection control information, a piece of the intersection control information that matches the travel trajectory information indicating a travel trajectory of the vehicle that reaches the intersection earliest among the vehicles approaching the intersection. According to the above configuration, when multiple vehicles is approaching the intersection at the same time and there is no intersection control information that satisfies all of the pieces of travel trajectory information of these vehicles at the same time, the vehicle to be permitted to enter the intersection can be selected at low calculation cost.

In the above aspect, the one or more processors may be configured to when the one or more processors select a piece of the intersection control information different from the selected piece of the intersection control information, send entry prohibition information prohibiting entry to the intersection to the vehicles located near the intersection, and after elapse of a predetermined time since sending the entry prohibition information to the vehicles, send a piece of the intersection control information newly selected to the vehicles located near the intersection. According to the above configuration, the vehicles located in the intersection can be eliminated when the intersection control unit switches the intersection control information.

In the above aspect, the one or more processors may be configured to predict that a pedestrian is going to cross any one of multiple roads connected to the intersection, and when the one or more processors predict crossing of the pedestrian, prohibit passage of the vehicle on the road the pedestrian is going to cross such that the vehicle does not obstruct the crossing of the pedestrian. According to the above configuration, crossing of the pedestrian is prioritized.

In the above aspect, the one or more processors may be configured to, in a case where there is any vehicle prohibited from passing through the intersection and waiting before the intersection, select a piece of the intersection control information that allows the vehicle waiting before the intersection to pass through the intersection when selecting a piece of the intersection control information different from the selected piece of the intersection control information. According to the above configuration, the waiting time of the vehicle waiting before the intersection can be reduced.

In the above aspect, the one or more processors may be configured to, when an emergency vehicle is approaching the intersection, select a piece of the intersection control information that does not obstruct passage of the emergency vehicle. According to the above configuration, the emergency vehicle can pass through the intersection without waiting before the intersection.

An intersection control method according to a second aspect of the present disclosure includes: storing multiple pieces of intersection control information that are different from each other; and controlling entry of a vehicle into an intersection using the pieces of the intersection control information. Each of the pieces of the intersection control information includes multiple pieces of permitted trajectory information that are different from each other, Each of the pieces of the permitted trajectory information is information indicating a travel trajectory that the vehicle is permitted to follow when passing through the intersection, and a plurality of the travel trajectories indicated by the pieces of the permitted trajectory information included in each of the pieces of the intersection control information do not interfere with each other. The controlling of entry of the vehicle into the intersection includes acquiring multiple pieces of travel trajectory information each of which indicates a travel trajectory that each of a plurality of the vehicles located near the intersection follows when passing through the intersection, selecting a piece of the intersection control information that matches the pieces of the travel trajectory information from among the pieces of the intersection control information, and sending the selected piece of the intersection control information to the vehicles located near the intersection. According to the above method, the number of vehicles that can enter an intersection at the same time can be increased while avoiding at low cost a collision between or among multiple vehicles entering the intersection at the same time.

A non-transitory storage medium according to a third aspect of the present disclosure stores a program that is executable by a computer and that causes the computer to perform the intersection control method according to the second aspect.

According to the above configuration, the number of vehicles that can enter an intersection at the same time can be increased while avoiding at low cost a collision between or among multiple vehicles entering the intersection at the same time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 shows intersection control information;

FIG. 5 shows a bit array of intersection control information;

FIG. 17 shows a bit array of intersection control information.

DETAILED DESCRIPTION OF EMBODIMENTS

Figure 1:
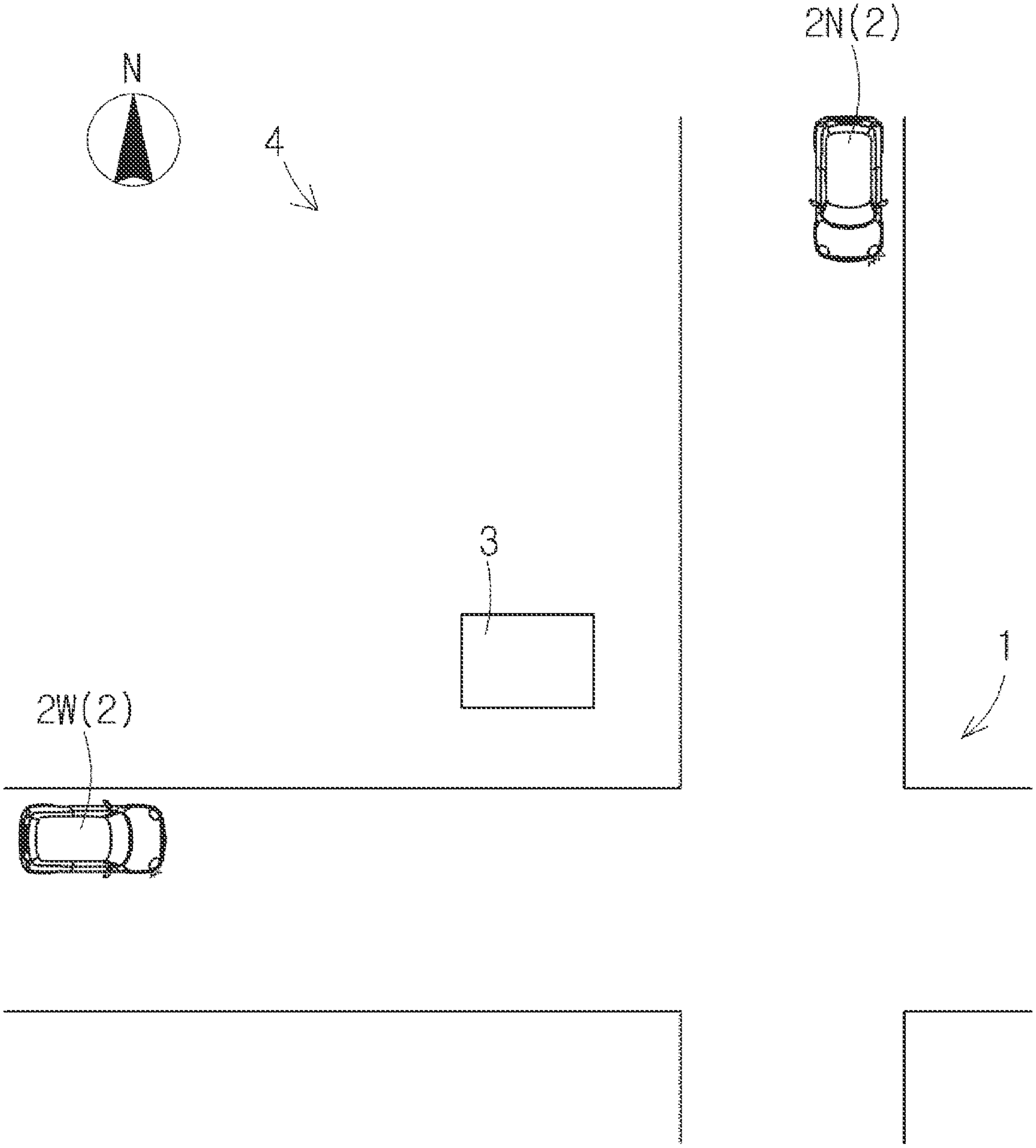
FIG. 1 is a plan view showing multiple vehicles approaching an intersection.

Hereinafter, an embodiment of the present disclosure will be described with reference to the drawings. FIG. 1 shows multiple vehicles 2 traveling toward an intersection 1. That is, in FIG. 1, the vehicles 2 are located near the intersection 1 and are approaching the intersection 1. Hereinafter, for convenience of explanation, the vehicle 2 traveling from north to south and approaching the intersection 1 is also referred to as the vehicle 2N. Similarly, the vehicle 2 traveling from west to east and approaching the intersection 1 is also referred to as the vehicle 2W. For convenience of explanation, it is assumed that the vehicle 2N turns left at the intersection 1 and the vehicle 2W turns right at the intersection 1. Each of the vehicles 2 is a vehicle that travels by autonomous driving control. However, the vehicles 2 may be driven by an occupant. As shown in FIG. 1, an intersection control device 3 is provided near the intersection 1.

The intersection control device 3 is a specific example of an intersection control system. A traffic system 4 includes the intersection control device 3, and the vehicles 2 located near the intersection 1. The intersection control device 3 may be implemented by a single device or may be implemented by distributed processing using multiple devices.

The intersection control device 3 and the vehicles 2 are configured to communicate bidirectionally by, for example, wireless communication technologies such as Wi-Fi (registered trademark) and Bluetooth (registered trademark).

Figure 2:
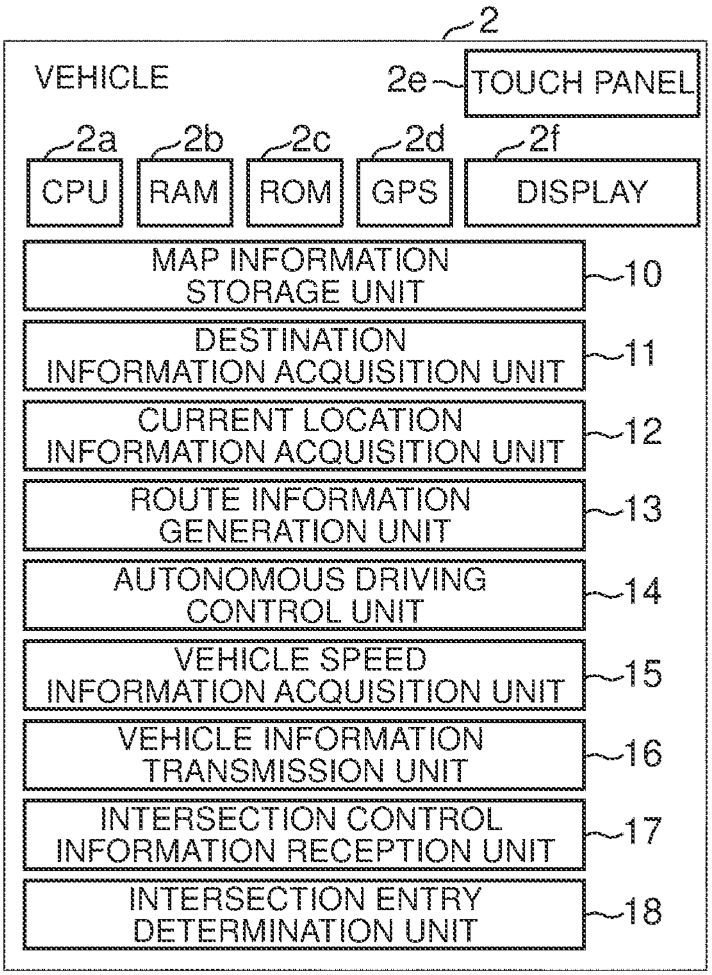
FIG. 2 is a functional block diagram of a vehicle.

FIG. 2 is a functional block diagram of the vehicle 2. As shown in FIG. 2, the vehicle 2 includes a central processing unit (CPU) 2*a*, a random access memory (RAM) 2*b* that is a read-write memory, and a read-only memory (ROM) 2*c*. The vehicle 2 further includes a Global Positioning System (GPS) module 2*d*, a touch panel 2*e*, and a display 2*f*. The touch panel 2*e* and the display 2*f* are typically integrated on top of each other. The CPU 2*a* reads and executes a control program stored in the ROM 2*c*. The control program thus causes hardware such as CPU 2*a* to function as various functional units.

The various functional units include a map information storage unit 10, a destination information acquisition unit 11, a current location information acquisition unit 12, a route information generation unit 13, an autonomous driving control unit 14, a vehicle speed information acquisition unit 15, a vehicle information transmission unit 16, an intersection control information reception unit 17, and an intersection entry determination unit 18.

The map information storage unit 10 stores map information. The map information typically includes node information and link information. The node information represents feature points of a road, and the link information represents the shape of the road by connecting two nodes. Feature points of the road include intersections.

The destination information acquisition unit 11 acquires destination information entered via the touch panel 2*e*.

The current location information acquisition unit 12 acquires current location information of the vehicle 2 by using the GPS module 2*d*. The GPS module 2*d* is a specific example of a Global Navigation Satellite System (GNSS) module. Specific examples of the GNSS module include a Global Navigation Satellite System (GLONASS) module, a Galileo module, a BeiDou module, and a Quasi-Zenith Satellite System (QZSS) module. The current location information acquisition unit 12 may estimate and acquire the current location information of the vehicle 2 based on the strength of a signal received from a radio base station and a beacon from the base station.

The route information generation unit 13 refers to the map information stored in the map information storage unit 10, and generates route information from the current location to the destination based on the destination information acquired by the destination information acquisition unit 11 and the current location information acquired by the current location information acquisition unit 12.

The route information includes multiple pieces of travel trajectory information. The pieces of travel trajectory information have one-to-one correspondence with multiple intersections through which the vehicle 2 passes.

Each piece of travel trajectory information indicates a travel trajectory the vehicle 2 follows when passing through a corresponding intersection. Each piece of travel trajectory information typically includes pre-passage direction identification information and post-passage direction identification information. The pre-passage direction identification information indicates the direction in which the vehicle 2 travels before passing through the intersection. The post-passage direction identification information indicates the direction in which the vehicle 2 travels after passing through the intersection. For example, since the vehicle 2N shown in FIG. 1 turns left at the intersection 1, the pre-passage direction identification information of the travel trajectory information corresponding to the intersection 1 is "south," and the post-passage direction identification information of the travel trajectory information corresponding to the intersection 1 is "east."

Alternatively, each piece of travel trajectory information may include pre-passage road identification information and post-passage road identification information. The pre-passage road identification information indicates the road on which the vehicle 2 travels before passing through the intersection 1. The post-passage road information indicates the road on which the vehicle 2 travels after passing through the intersection 1. For example, it is herein assumed that the road identification (ID) of the road running north from the intersection 1 is "No. 1234," and the road ID of the road running east from the intersection 1 is "No. 2345." Since the vehicle 2N shown in FIG. 1 turns left at the intersection 1, the pre-passage road identification information of the travel trajectory information corresponding to the intersection 1 is "1234," and the post-passage road identification information of the travel trajectory information corresponding to the intersection 1 is "2345."

The autonomous driving control unit 14 controls traveling of the vehicle 2 according to the route information generated by the route information generation unit 13.

The vehicle speed information acquisition unit 15 acquires vehicle speed information of the vehicle 2 based on a detection signal from a vehicle speed sensor that detects the vehicle speed of the vehicle 2.

The vehicle information transmission unit 16 sends the current location information acquired by the current location information acquisition unit 12 and the vehicle speed information acquired by the vehicle speed information acquisition unit 15 to the intersection control device 3 at predetermined intervals. For example, the predetermined interval is, but not limited to, one second. The vehicle information transmission unit 16 further sends the travel trajectory information corresponding to the currently approaching intersection 1 to the intersection control device 3.

The intersection control information reception unit 17 receives intersection control information from the intersection control device 3. The intersection control information is information indicating a travel trajectory that the vehicle 2 is permitted to follow at the intersection 1, such as traffic signal lights installed at the intersection 1. This will be described in detail later.

The intersection entry determination unit 18 determines whether the vehicle 2 can enter the intersection 1, based on the intersection control information received by the intersection control information reception unit 17. The autonomous driving control unit 14 causes the vehicle 2 to enter the intersection 1 or causes the vehicle 2 to wait before the intersection 1, based on the result of determination made by the intersection entry determination unit 18.

Figure 3:
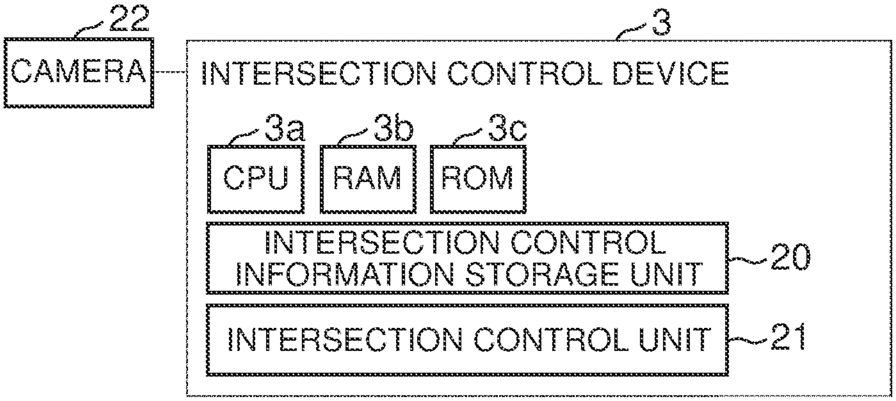
FIG. 3 is a functional block diagram of an intersection control device.

FIG. 3 is a functional block diagram of the intersection control device 3. As shown in FIG. 3, the intersection control device 3 includes a CPU 3*a*, a RAM 3*b* that is a read-write memory, and a ROM 3*c*. A camera 22 is connected to the intersection control device 3. The camera 22 captures an image of the intersection 1, the vehicle(s) 2 located near the intersection 1, and a pedestrian(s) crossing the road near the intersection 1. The CPU 3*a* reads and executes a control program stored in the ROM 3*c*. The control program thus causes hardware such as CPU 3*a* to function as the intersection control unit 21 and the intersection control information storage unit 20. The intersection control information storage unit 20 is a specific example of a storage unit. The intersection control unit 21 is a specific example of a control unit.

The intersection control information storage unit 20 stores multiple pieces of intersection control information that are different from each other. Each piece of intersection control information includes multiple pieces of permitted trajectory information that are different from each other. Each piece of permitted trajectory information is information indicating a travel trajectory that the vehicle 2 is permitted to follow when passing through the intersection 1. The travel trajectories indicated by the pieces of permitted trajectory information included in each piece of intersection control information are set so as not to interfere with each other. As used herein, "do not interfere with each other" may mean "do not merge with each other" and "do not intersect each other."

FIG. 4 shows multiple pieces of intersection control information. That is, FIG. 4 shows multiple pieces of intersection control information identified by Control No. 1 to Control No. 17.

In the present embodiment, each piece of intersection control information is a 12-bit array. Each piece of permitted trajectory information is represented by an index of the bit array of each piece of intersection control information and the value of the index. FIG. 5 shows a bit array of a piece of intersection control information. As shown in FIG. 5, the value of the first bit (index=1) of the intersection control information being "1" means that a travel trajectory along which the vehicle 2 enters the intersection 1 from the north and turns left at the intersection 1 is permitted. The value of the first bit (index=1) of the intersection control information being "0" means that the travel trajectory along which the vehicle 2 enters the intersection 1 from the north and turns left at the intersection 1 is prohibited. The same applies to the second and subsequent bits of the intersection control information. Each piece of intersection control information may include intersection identification information identifying the intersection 1. Each piece of intersection control information may include valid time information indicating the start time when the intersection control information becomes valid and the end time when the intersection control information becomes no longer valid. Each piece of intersection control information may include permitted vehicle identification information identifying the type of vehicle that is permitted to pass through the intersection 1.

Figure 6:
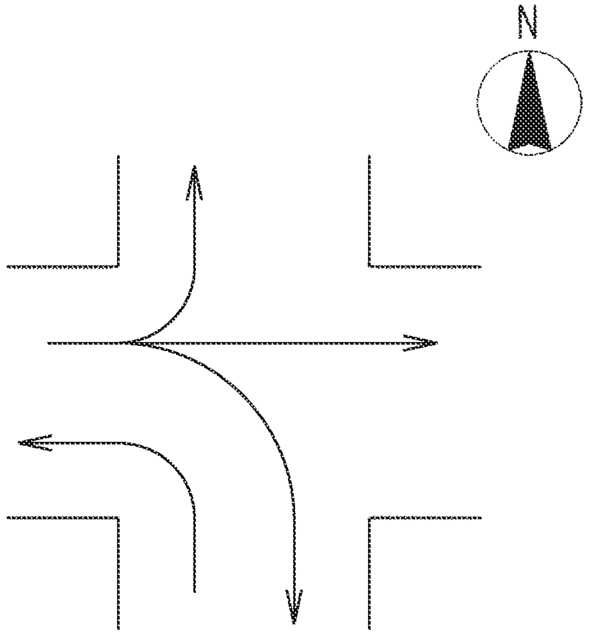
FIG. 6 shows visualized intersection control information of Control No. 1.

Referring back to FIG. 4, the 7th, 10th, 11th, and 12th bits of the intersection control information of Control No. 1 are "1," and the other bits of the intersection control information of Control No. 1 are "0." Therefore, as shown in FIG. 6, the intersection control information of Control No. 1 indicates that "a travel trajectory along which the vehicle 2 enters the intersection 1 from the south and turns left at the intersection 1 is permitted," "a travel trajectory along which the vehicle 2 enters the intersection 1 from the west and turns left at the intersection 1 is permitted," "a travel trajectory along which the vehicle 2 enters the intersection 1 from the west and goes straight through the intersection 1 is permitted," and "a travel trajectory along which the vehicle 2 enters the intersection 1 from the west and turns right at the intersection 1 is permitted." As shown in FIG. 6, the travel trajectories indicated by the four pieces of permitted trajectory information included in the intersection control information of Control No. 1 do not interfere with each other. Therefore, as long as the vehicles 2 travel according to the intersection control information of Control No. 1, the vehicles 2 will not collide with each other when passing through the intersection 1.

Figure 7:
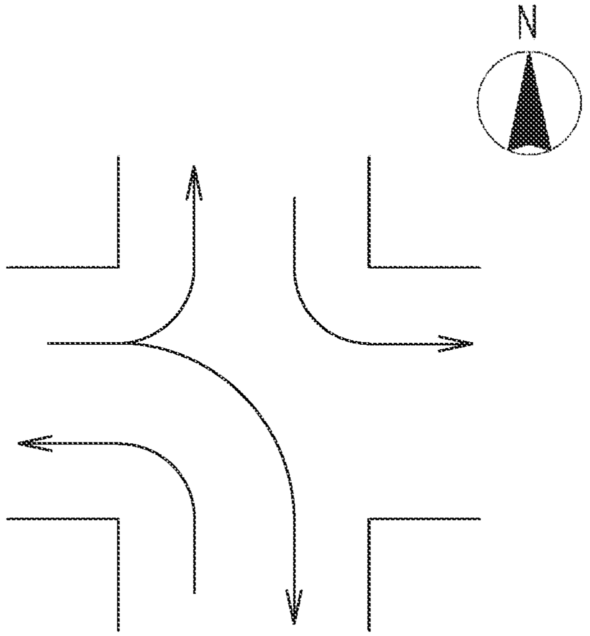
FIG. 7 shows visualized intersection control information of Control No. 5.

Referring back to FIG. 4, the 1st, 7th, 10th, and 12th bits of the intersection control information of Control No. 5 are "1," and the other bits of the intersection control information of Control No. 5 are "0." Therefore, as shown in FIG. 7, the intersection control information of Control No. 5 indicates that "a travel trajectory along which the vehicle 2 enters the intersection 1 from the north and turns left at the intersection 1 is permitted," "a travel trajectory along which the vehicle 2 enters the intersection 1 from the south and turns left at the intersection 1 is permitted," "a travel trajectory along which the vehicle 2 enters the intersection 1 from the west and turns left at the intersection 1 is permitted," and "a travel trajectory along which the vehicle 2 enters the intersection 1 from the west and turns right at the intersection 1 is permitted." As shown in FIG. 7, the travel trajectories indicated by the four pieces of permitted trajectory information included in the intersection control information of Control No. 5 do not interfere with each other. Therefore, as long as the vehicles 2 travel according to the intersection control information of Control No. 5, the vehicles 2 will not collide with each other when passing through the intersection 1.

Figure 8:
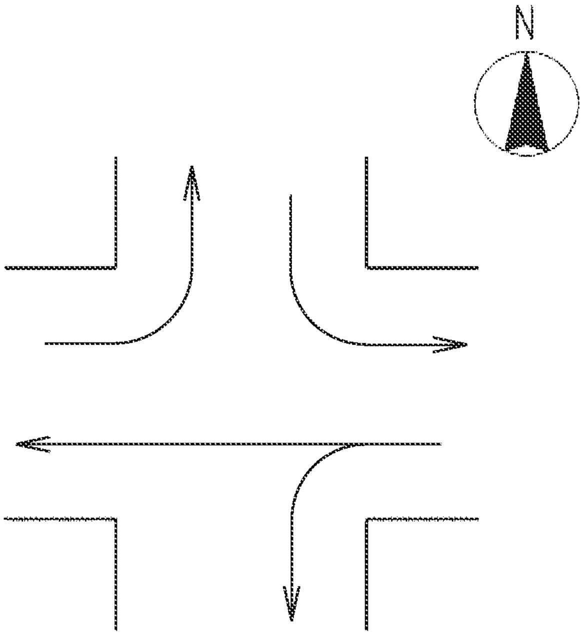
FIG. 8 shows visualized intersection control information of Control No. 9.

Referring back to FIG. 4, the 1st, 4th, 5th, and 10th bits of the intersection control information of Control No. 9 are "1," and the other bits of the intersection control information of Control No. 9 are "0." Therefore, as shown in FIG. 8, the intersection control information of Control No. 9 indicates that "a travel trajectory along which the vehicle 2 enters the intersection 1 from the north and turns left at the intersection 1 is permitted," "a travel trajectory along which the vehicle 2 enters the intersection 1 from the east and turns left at the intersection 1 is permitted," "a travel trajectory along which the vehicle 2 enters the intersection 1 from the east and goes straight through the intersection 1 is permitted," and "a travel trajectory along which the vehicle 2 enters the intersection 1 from the west and turns left at the intersection 1 is permitted." As shown in FIG. 8, the travel trajectories indicated by the four pieces of permitted trajectory information included in the intersection control information of Control No. 9 do not interfere with each other. Therefore, as long as the vehicles 2 travel according to the intersection control information of Control No. 9, the vehicles 2 will not collide with each other when passing through the intersection 1.

Figure 9:
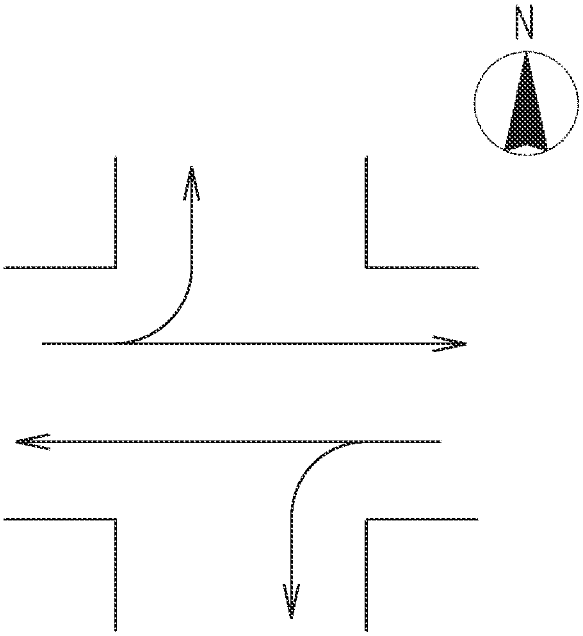
FIG. 9 shows visualized intersection control information of Control No. 13.

Referring back to FIG. 4, the 4th, 5th, 10th, and 11th bits of the intersection control information of Control No. 13 are "1," and the other bits of the intersection control information of Control No. 13 are "0." Therefore, as shown in FIG. 9, the intersection control information of Control No. 13 indicates that "a travel trajectory along which the vehicle 2 enters the intersection 1 from the east and turns left at the intersection 1 is permitted," "a travel trajectory along which the vehicle 2 enters the intersection 1 from the east and goes straight through the intersection 1 is permitted," "a travel trajectory along which the vehicle 2 enters the intersection 1 from the west and turns left at the intersection 1 is permitted," and "a travel trajectory along which the vehicle 2 enters the intersection 1 from the west and goes straight through the intersection 1 is permitted." As shown in FIG. 9, the travel trajectories indicated by the four pieces of permitted trajectory information included in the intersection control information of Control No. 13 do not interfere with each other. Therefore, as long as the vehicles 2 travel according to the intersection control information of Control No. 13, the vehicles 2 will not collide with each other when passing through the intersection 1.

Figure 10:
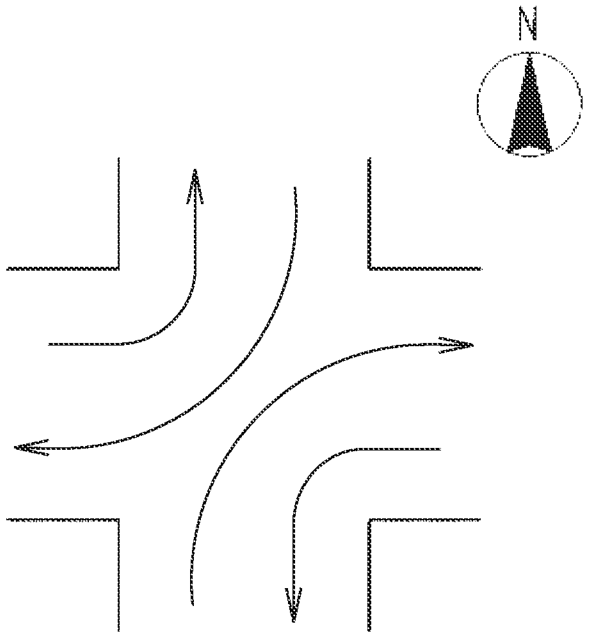
FIG. 10 shows visualized intersection control information of Control No. 15.

Referring back to FIG. 4, the 3rd, 4th, 9th, and 10th bits of the intersection control information of Control No. 15 are "1," and the other bits of the intersection control information of Control No. 15 are "0." Therefore, as shown in FIG. 10, the intersection control information of Control No. 15 indicates that "a travel trajectory along which the vehicle 2 enters the intersection 1 from the north and turns right at the intersection 1 is permitted," "a travel trajectory along which the vehicle 2 enters the intersection 1 from the east and turns left at the intersection 1 is permitted," "a travel trajectory along which the vehicle 2 enters the intersection 1 from the south and turns right at the intersection 1 is permitted," and "a travel trajectory along which the vehicle 2 enters the intersection 1 from the west and turns left at the intersection 1 is permitted." As shown in FIG. 10, the travel trajectories indicated by the four pieces of permitted trajectory information included in the intersection control information of Control No. 15 do not interfere with each other. Therefore, as long as the vehicles 2 travel according to the intersection control information of Control No. 15, the vehicles 2 will not collide with each other when passing through the intersection 1.

Figure 11:
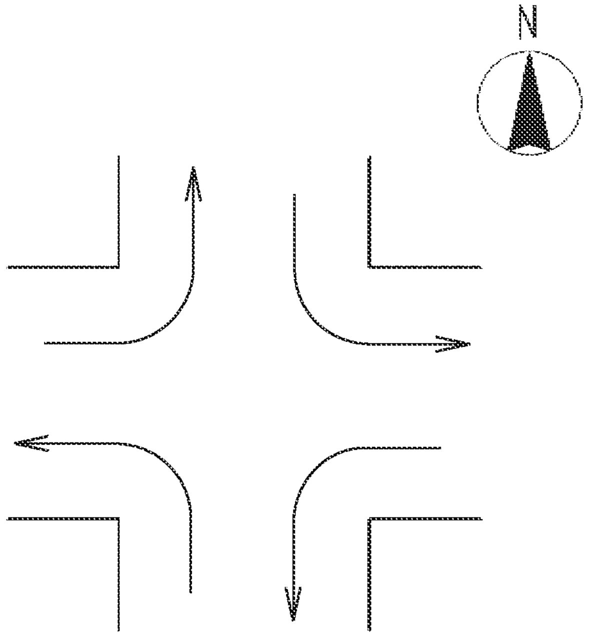
FIG. 11 shows visualized intersection control information of Control No. 17.

Referring back to FIG. 4, the 1st, 4th, 7th, and 10th bits of the intersection control information of Control No. 17 are "1," and the other bits of the intersection control information of Control No. 17 are "0." Therefore, as shown in FIG. 11, the intersection control information of Control No. 17 indicates that "a travel trajectory along which the vehicle 2 enters the intersection 1 from the north and turns left at the intersection 1 is permitted," "a travel trajectory along which the vehicle 2 enters the intersection 1 from the east and turns left at the intersection 1 is permitted," "a travel trajectory along which the vehicle 2 enters the intersection 1 from the south and turns left at the intersection 1 is permitted," and "a travel trajectory along which the vehicle 2 enters the intersection 1 from the west and turns left at the intersection 1 is permitted." As shown in FIG. 11, the travel trajectories indicated by the four pieces of permitted trajectory information included in the intersection control information of Control No. 17 do not interfere with each other. Therefore, as long as the vehicles 2 travel according to the intersection control information of Control No. 17, the vehicles 2 will not collide with each other when passing through the intersection 1.

The intersection control unit 21 controls entry of the vehicle 2 into the intersection 1 using the pieces of intersection control information stored in the intersection control information storage unit 20. This will be specifically described below.

First, the intersection control unit 21 acquires multiple pieces of travel trajectory information of the multiple vehicles 2 located near the intersection 1 that indicate the travel trajectories the vehicles 2 follows when passing through the intersection 1. In the present embodiment, the intersection control unit 21 receives the travel trajectory information from each vehicle 2 to acquire the travel trajectory information of each vehicle 2 corresponding to the intersection 1. That is, the intersection control unit 21 acquires multiple pieces of travel trajectory information from the multiple vehicles 2 located near the intersection 1. Alternatively, the intersection control unit 21 may determine whether a turn signal of each vehicle 2 located near the intersection 1 is on based on the captured image information output from the camera 22, and may generate the travel trajectory information of each vehicle 2 based on the determination result.

The intersection control unit 21 selects the intersection control information that matches the acquired pieces of travel trajectory information from the pieces of intersection control information stored in the intersection control information storage unit 20. As shown in FIG. 1, since the vehicle 2N turns left at the intersection 1 and the vehicle 2W turns right at the intersection 1, the intersection control information that matches the pieces of travel trajectory information of the vehicles 2N and 2W corresponding to the intersection 1 is, for example, the intersection control information of Control No. 5 shown in FIG. 4. Refer also FIG. 7 as the pieces of permitted trajectory information included in the intersection control information of Control No. 5 are shown in FIG. 7.

The intersection control unit 21 broadcasts the selected intersection control information of Control No. 5 to the vehicles 2 located near the intersection 1. The intersection control unit 21 distributes the selected intersection control information of Control No. 5 to the vehicle 2N and the vehicle 2W.

Figures 12, 13:
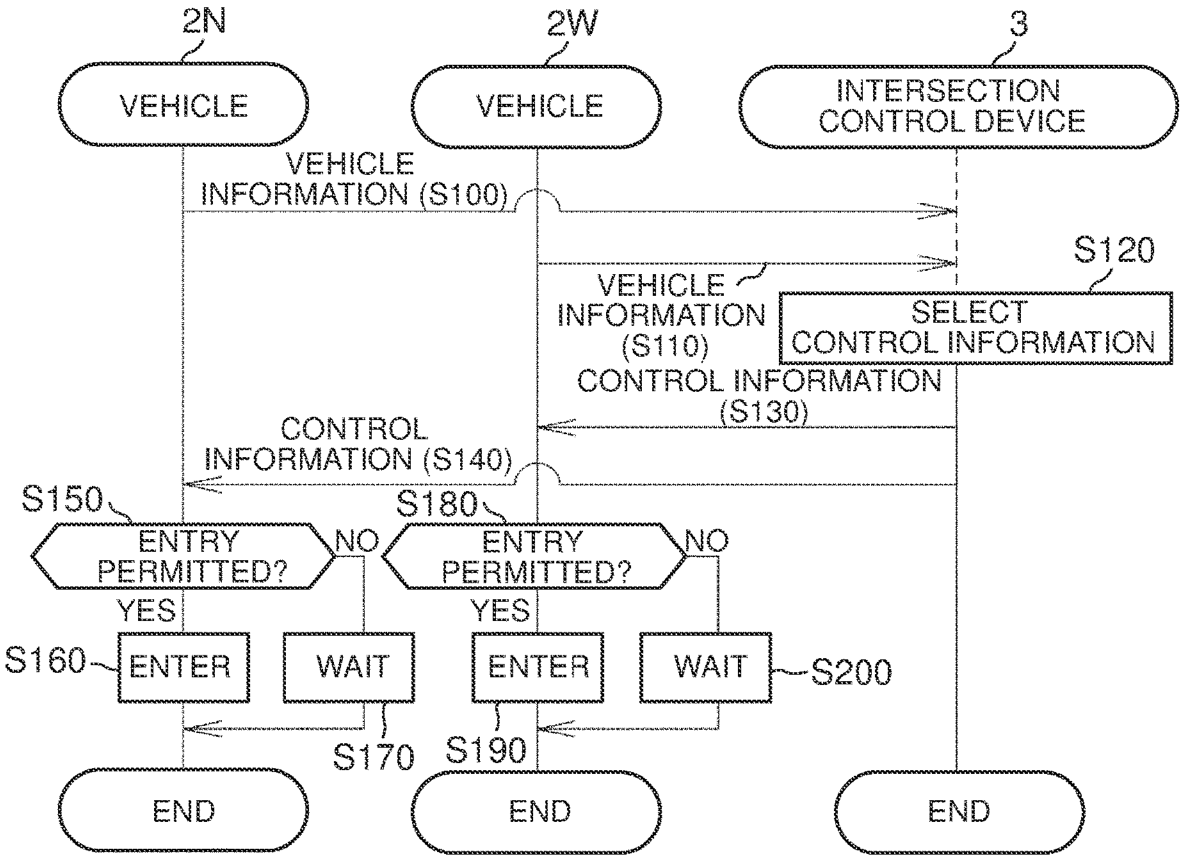
FIG. 12 shows a control flow of a traffic control system.
FIG. 13 shows vehicle entry information.

Next, the control flow of the traffic system 4 will be described with reference to FIGS. 12 and 13. It is herein assumed that the vehicle 2N and the vehicle 2W are autonomously driven according to the generated route information and are approaching the intersection 1. It is also assumed that the vehicle 2N and the vehicle 2W are traveling toward the intersection 1 such that the vehicle 2N and the vehicle 2W enter the intersection 1 at substantially the same time.

S100: First, the vehicle information transmission unit 16 of the vehicle 2N sends the vehicle information of the vehicle 2N to the intersection control device 3. The vehicle information includes the current location information, the vehicle speed information, and the travel trajectory information corresponding to the intersection 1.

S110: The vehicle information transmission unit 16 of the vehicle 2W sends the vehicle information of the vehicle 2W to the intersection control device 3.

S120: The intersection control unit 21 of the intersection control device 3 calculates in how many seconds the vehicle 2N and the vehicle 2W will enter the intersection 1, based on the current location information and vehicle speed information received from each of the vehicle 2N and the vehicle 2W. For convenience of explanation, it is herein assumed that the vehicle 2N will enter the intersection 1 in one second and the vehicle 2W will enter the intersection 1 in three seconds. The intersection control unit 21 calculates whether the vehicle 2N and the vehicle 2W pass through the intersection 1 at the same time by calculating the time until the vehicle 2N and the vehicle 2W enter the intersection 1. As shown in FIG. 13, the vehicle 2N and the vehicle 2W travel in the intersection 1 at the same time when passing through the intersection 1. The intersection control unit 21 therefore determines that the vehicle 2N and the vehicle 2W pass through the intersection 1 at the same time. The intersection control unit 21 then selects a piece of the intersection control information that matches both the travel trajectory information of the vehicle 2N and the travel trajectory information of the vehicle 2W.

S130, S140: Referring back to FIG. 12, the intersection control unit 21 sends the selected piece of the intersection control information to the vehicle 2N and the vehicle 2W.

S150: The intersection entry determination unit 18 of the vehicle 2N collates the travel trajectory information corresponding to the intersection 1 with the intersection control information received from the intersection control device 3, and determines whether the travel trajectory information substantially matches any one of the pieces of permitted trajectory information included in the intersection control information. When the travel trajectory information substantially matches any one of the pieces of permitted trajectory information included in the intersection control information (S150: YES), the intersection entry determination unit 18 determines that entry to the intersection 1 is permitted.

S160: When the intersection entry determination unit 18 determines that entry to the intersection 1 is permitted (S150: YES), the autonomous driving control unit 14 controls the vehicle 2N so that the vehicle 2N will enter the intersection 1 without waiting before the intersection 1 and will turn left at the intersection 1 according to the travel trajectory information corresponding to the intersection 1.

In the present embodiment, since the intersection control unit 21 selects the intersection control information that matches the travel trajectory information of the vehicle 2N, the determination result of step S150 is YES.

S170: When the intersection entry determination unit 18 determines that entry to the intersection 1 is not permitted (S150: NO), the autonomous driving control unit 14 controls the vehicle 2N so that the vehicle 2N will wait before the intersection 1.

S180: Similarly, the intersection entry determination unit 18 of the vehicle 2W collates the travel trajectory information corresponding to the intersection 1 with the intersection control information received from the intersection control device 3, and determines whether the travel trajectory information substantially matches any one of the pieces of permitted trajectory information included in the intersection control information. When the travel trajectory information substantially matches any one of the pieces of permitted trajectory information included in the intersection control information (S180: YES), the intersection entry determination unit 18 determines that entry to the intersection 1 is permitted.

S190: When the intersection entry determination unit 18 determines that entry to the intersection 1 is permitted (S180: YES), the autonomous driving control unit 14 controls the vehicle 2W so that the vehicle 2W will enter the intersection 1 without waiting before the intersection 1 and will turn right at the intersection 1 according to the travel trajectory information corresponding to the intersection 1.

In the present embodiment, since the intersection control unit 21 selects the intersection control information that matches the travel trajectory information of the vehicle 2W, the determination result of step S180 is YES.

S200: When the intersection entry determination unit 18 determines that entry to the intersection 1 is not permitted (S180: NO), the autonomous driving control unit 14 controls the vehicle 2W so that the vehicle 2W will wait before the intersection 1.

As a result, the vehicle 2N and the vehicle 2W can pass through the intersection 1 according to the travel trajectory information of each vehicle 2 without waiting before the intersection 1.

Although the embodiment of the present disclosure is described above, the embodiment has the following features.

The intersection control device 3 (intersection control system) includes the intersection control information storage unit 20 (storage unit) and the intersection control unit 21 (control unit). The intersection control information storage unit 20 stores multiple pieces of intersection control information that is different from each other. Each piece of intersection control information includes multiple pieces of permitted trajectory information that is different from each other. Each piece of permitted trajectory information is information indicating a travel trajectory that the vehicle 2 is permitted to follow when passing through the intersection 1. The travel trajectories indicated by the pieces of permitted trajectory information included in each piece of intersection control information do not interfere with each other. The intersection control unit 21 controls entry of the vehicle 2 into the intersection 1 using the pieces of intersection control information. Specifically, the intersection control unit 21 acquires multiple pieces of travel trajectory information of the multiple vehicles 2 located near the intersection 1. Each piece of travel trajectory information indicates a travel trajectory the vehicle 2 follows when passing through the intersection 1. The intersection control unit 21 selects the intersection control information that matches the acquired pieces of travel trajectory information from the pieces of intersection control information stored in the intersection control information storage unit 20. The intersection control unit 21 sends the selected intersection control information to the vehicles 2 located near the intersection 1. According to the above configuration, the number of vehicles 2 that can enter the intersection 1 at the same time can be increased while avoiding at low cost a collision between or among multiple vehicles 2 entering the intersection 1 at the same time.

The above embodiment may be modified as follows.

For example, when there is no vehicle passing through the intersection 1, the intersection control unit 21 may select the intersection control information that matches the travel trajectory information of the vehicle 2 that reaches the intersection 1 earliest among multiple vehicles 2 approaching the intersection 1. According to the above configuration, when multiple vehicles 2 is approaching the intersection 1 at the same time and there is no intersection control information that satisfies all of the pieces of travel trajectory information of these vehicles 2 at the same time, the vehicle 2 to be preferentially permitted to enter the intersection 1 can be selected at low calculation cost.

In this case, the intersection control unit 21 may determine whether there is any vehicle passing through the intersection 1, based on the captured image information output from the camera 22. The intersection control unit 21 may determine whether there is any vehicle passing through the intersection 1, based on the current location information of each vehicle 2 received from each vehicle 2 located near the intersection 1.

When the intersection control unit 21 selects a piece of the intersection control information different from the currently selected piece of the intersection control information, the intersection control unit 21 may send entry prohibition information prohibiting entry to the intersection 1 to the vehicles 2 located near the intersection 1. After elapse of a predetermined time since sending the entry prohibition information to the vehicles 2, the intersection control unit 21 may send the newly selected piece of the intersection control information to the vehicles 2 located near the intersection 1. According to the above configuration, the vehicles 2 located in the intersection 1 can be eliminated when the intersection control unit 21 switches the intersection control information.

In this case, the predetermined time may be, for example, about three to five seconds.

In the case where there is any vehicle 2 prohibited from passing through the intersection 1 and thus waiting before the intersection 1, the intersection control unit 21 may select a piece of the intersection control information that allows the vehicle 2 waiting before the intersection 1 to pass through the intersection 1, when the intersection control unit 21 selects a piece of the intersection control information different from the currently selected piece of the intersection control information, namely the next time the intersection control unit 21 switches the intersection control information. According to the above configuration, the waiting time of the vehicle 2 waiting before the intersection 1 can be reduced.

When an emergency vehicle is approaching the intersection 1, the intersection control unit 21 may select a piece of the intersection control information that does not obstruct passage of the emergency vehicle. According to the above configuration, the emergency vehicle can pass through the intersection 1 without waiting before the intersection 1.

The intersection control device 3 may further include a crossing prediction unit that predicts that a pedestrian(s) is going to cross any one of multiple roads connected to the intersection 1. In the present embodiment, the intersection control unit 21 corresponds to the crossing prediction unit. When the intersection control unit 21 predicts the crossing of a pedestrian(s), the intersection control unit 21 prohibits passage of the vehicle 2 on the road the pedestrian(s) is going to cross such that the vehicle 2 does not obstruct the crossing of the pedestrian(s). Typically, the intersection control unit 21 may correct the currently selected piece of the intersection control information and send the corrected piece of the intersection control information to the vehicles 2 located near the intersection 1.

In this case, the intersection control unit 21 may predict that a pedestrian(s) will cross any one of the roads connected to the intersection 1, based on the captured image information output from the camera 22. For example, the intersection control unit 21 predicts that a pedestrian(s) will cross any one of the roads connected to the intersection 1 by detecting a pedestrian facing any of the roads connected to the intersection 1 by a known object detection technique.

Figure 14:
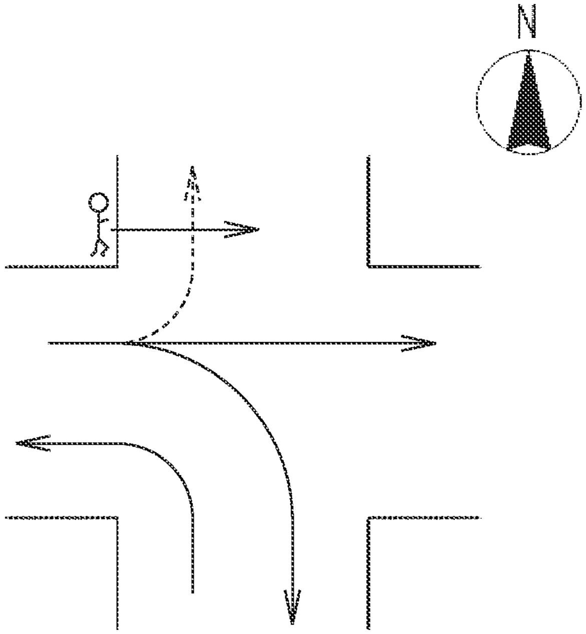
FIG. 14 shows crossing of a pedestrian.
Figure 15:
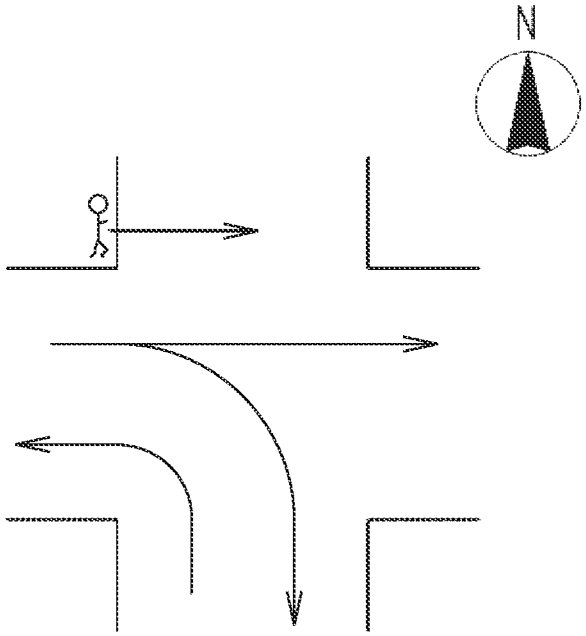
FIG. 15 shows visualized corrected intersection control information.

FIG. 14 shows a pedestrian who is about to cross the road running north from the intersection 1. In this case, the intersection control unit 21 corrects the intersection control information as shown in FIG. 15 so as to invalidate the piece of permitted trajectory information that interferes with the crossing of the pedestrian out of the pieces of permitted trajectory information included in the intersection control information shown in FIG. 14. The intersection control unit 21 then sends the corrected intersection control information to the vehicles 2 located near the intersection 1. The crossing of the pedestrian(s) can thus be prioritized over the entry of the vehicle 2 into the intersection 1.

Figure 16:
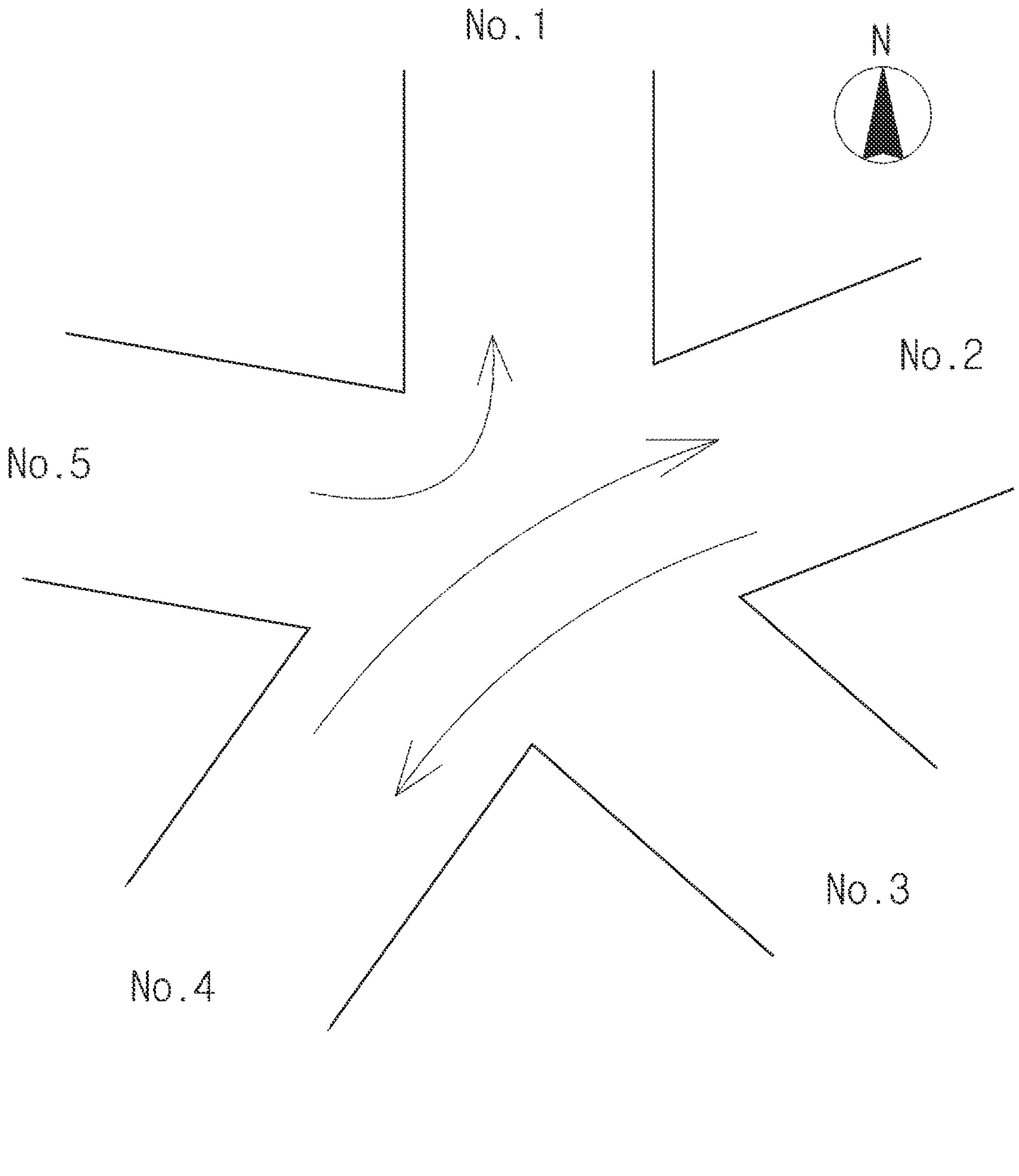
FIG. 16 is a plan view of a five-way intersection.

When the intersection 1 is a five-way intersection as shown in FIG. 16, the intersection control information corresponding to the intersection 1 may be represented by a 20-bit array as shown in FIG. 17. Each piece of permitted trajectory information included in each piece of intersection control information is represented by an index of the bit array of each piece of intersection control information and the value of the index. The value of the first bit (index=1) of the intersection control information being "1" means that a travel trajectory along which the vehicle 2 enters the intersection 1 from the road with the road ID of 1 and travels to the road with the road ID of 2 is permitted. On the other hand, the value of the first bit (index=1) of the intersection control information being "0" means that the travel trajectory along which the vehicle 2 enters the intersection 1 from the road with the road ID of 1 and travels to the road with the road ID of 2 is prohibited. Each piece of permitted trajectory information is thus identified by the road ID of the road on the entrance side of the piece of permitted trajectory information and the road ID of the road on the exit side of the piece of permitted trajectory information. Accordingly, the permitted trajectory information can be represented without any problem even when the number of roads connected to the intersection 1 is large.

In the above example, the program can be stored and supplied to a computer using various types of non-transitory computer-readable medium. The non-transitory computer-readable medium includes various types of tangible storage medium. Examples of the non-transitory computer-readable medium include magnetic recording media (e.g., flexible disk, magnetic tape, hard disk drive) and magneto-optical recording media (e.g., magneto-optical disk). Examples of the non-transitory computer-readable medium further include a compact disc read-only memory (CD-ROM), a compact disc recordable (CD-R), a compact disc rewritable (CD-RW), and a semiconductor memory (including, e.g., a mask ROM). Examples of the non-transitory computer-readable medium further include a programmable ROM (PROM), an erasable PROM (EPROM), a flash ROM, and a random access memory (RAM). The program may also be supplied to the computer by various types of transitory computer-readable medium. Examples of the transitory computer-readable medium include electrical signals, optical signals, and electromagnetic waves. The transitory computer-readable medium can supply the program to the computer via a wired communication path such as electric wire and optical fiber, or a wireless communication path.

What is claimed is:

1. An intersection control system comprising:

a storage storing multiple pieces of intersection control information, each piece of the intersection control information including permitted trajectory information, the pieces of the permitted trajectory information indicating distinct travel trajectories that vehicles are respectively permitted to follow when the vehicles pass through an intersection, and the distinct travel trajectories not interfering with each other; and one or more processors, wherein in a control of entry of the vehicles into the intersection, the one or more processors are configured to acquire multiple pieces of travel trajectory information indicating travel trajectories to be followed by the respective vehicles located near the intersection when the vehicles pass through the intersection, select a piece of the intersection control information including the permitted trajectory information that partially or wholly matches the acquired travel trajectory information, from among the multiple pieces of the intersection control information, and broadcast the selected piece of the intersection control information to the vehicles located near the intersection.

2. The intersection control system according to claim 1, wherein the distinct travel trajectories neither merge with each other nor intersect each other.

3. The intersection control system according to claim 1, wherein the travel trajectory information includes pre-passage road identification information and post-passage road identification information, each piece of the pre-passage road identification information indicating a road on which each of the vehicles travels before passing through the intersection, and each piece of the post-passage road identification information indicating a road on which each of the vehicles travels after passing through the intersection.

4. The intersection control system according to claim 1, wherein the travel trajectory information includes pre-passage direction identification information and post-passage direction identification information, each piece of the prepassage direction identification information indicating a direction in which each of the vehicles travels before passing through the intersection, and each piece of the post-passage direction identification information indicating a direction in which each of the vehicles travels after passing through the intersection.

5. The intersection control system according to claim 1, wherein the one or more processors are configured to select a prior piece of the intersection control information from among the multiple pieces of the intersection control information when there is no vehicle passing through the intersection, the prior piece of the intersection control information including the permitted trajectory information that partially or wholly matches the travel trajectory information indicating a travel trajectory of a prior vehicle, and the prior vehicle the intersection earliest among the vehicles approaching the intersection.

6. The intersection control system according to claim 1, wherein the one or more processors are configured to when the one or more processors select another piece of the intersection control information different from the selected piece of the intersection control information, send entry prohibition information prohibiting entry to the intersection to the vehicles located near the intersection, and after elapse of a predetermined time since sending the entry prohibition information to the vehicles, broadcast the other piece of the intersection control information newly selected to the vehicles located near the intersection.

7. The intersection control system according to claim 1, wherein the one or more processors are configured to predict that a pedestrian is going to cross any one of multiple roads connected to the intersection, and when the one or more processors predict crossing of the pedestrian, prohibit passage of the vehicle on the road the pedestrian is going to cross such that the vehicle does not obstruct the crossing of the pedestrian.

8. The intersection control system according to claim 1, wherein, when the one or more processors select another piece of the intersection control information different from the selected piece of the intersection control information in a state where any vehicle is prohibited from passing through the intersection and waiting before the intersection, the one or more processors are configured to select a piece of the intersection control information that allows the vehicle waiting before the intersection to pass through the intersection as the other piece of the intersection control information.

9. The intersection control system according to claim 1, wherein the one or more processors are configured to, when an emergency vehicle is approaching the intersection, select a piece of the intersection control information that does not obstruct passage of the emergency vehicle.

10. The intersection control system according to claim 1, wherein each piece of the intersection control information is a bit array, the bit array including multiple bits respectively indicating permission or prohibition to follow for all potential trajectories in the intersection.

11. An intersection control method comprising:

storing multiple pieces of intersection control information, each piece of the intersection control information including permitted trajectory information, the permitted trajectory information indicating distinct travel trajectories that vehicles are respectively permitted to follow when the vehicles pass through an intersection, and the distinct travel trajectories not interfering with each other; and in a control of entry of the vehicles into the intersection, acquiring multiple pieces of travel trajectory information indicating travel trajectories to be followed by the respective vehicles located near the intersection when the vehicles pass through the intersection, selecting a piece of the intersection control information including the permitted trajectory information that partially or wholly matches the acquired travel trajectory information, from among the multiple pieces of the intersection control information, and broadcasting the selected piece of the intersection control information to the vehicles located near the intersection.

* * * * *